Oct. 16, 1945.  P. B. REEVES  2,387,183
BELT BLOCK
Filed April 7, 1943
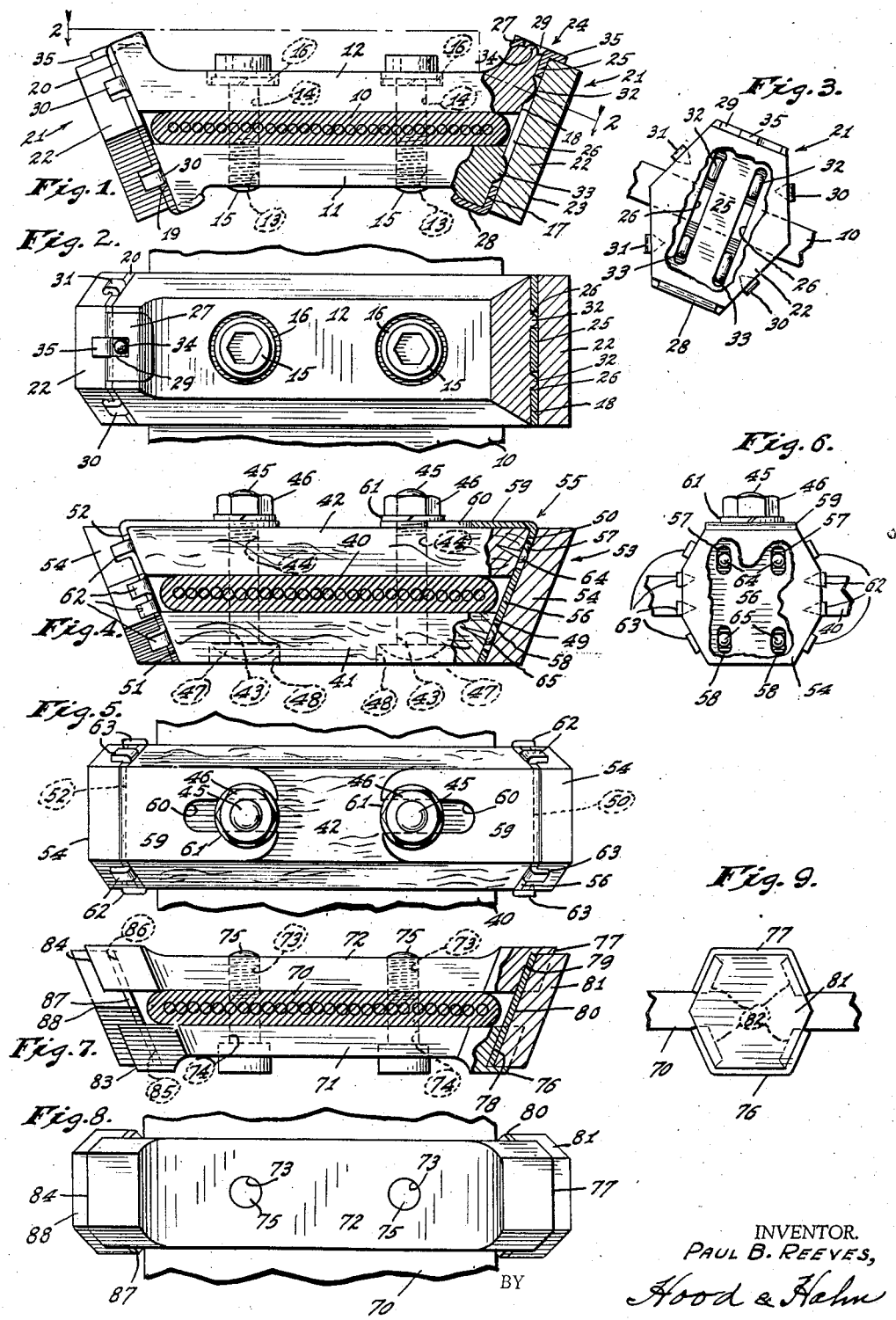
INVENTOR.
PAUL B. REEVES,
BY Hood & Hahn
ATTORNEYS.

Patented Oct. 16, 1945

2,387,183

UNITED STATES PATENT OFFICE 2,387,183

BELT BLOCK

Paul B. Reeves, Columbus, Ind., assignor to Reeves Pulley Company, Columbus, Ind., a corporation of Indiana Application April 7, 1943, Serial No. 482,108

9 Claims. (Cl. 74—236)

The present invention relates to power transmission belts, and more particularly to belts of the type in which transverse stiffness is imparted to a belt body by blocks secured to the belt body. The primary object of the invention is to provide more satisfactory friction means at the lateral ends of the blocks for cooperation with the inclined faces of V-pulleys between which the belt transmits power. A further object of the invention is to provide improved means for securing such friction means to the ends of such blocks. A further object of the invention is to provide removable and readily attachable friction means capable of being assembled with the belt blocks, after assembly of the blocks with the belt body. A still further object of the invention is to provide friction means each of which is associable with the corresponding ends of a pair of blocks respectively secured to opposite surfaces of the belt, the friction means bridging the gap or space between the blocks of the pair. A further object of the invention is to provide means rendering feasible the use of metal stiffener blocks, whereby stiffener blocks produced to closer dimensional tolerances may be used, so that it becomes unnecessary to destroy the hair side of the leather pads incorporated in the removable tip units.

Further objects of the invention will appear as the description proceeds.

To the accomplishment of the above and related objects, my invention may be embodied in the forms illustrated in the accompanying drawing, attention being called to the fact, however, that the drawing is illustrative only, and that change may be made in the specific constructions illustrated and described, so long as the scope of the appended claims is not violated.

Fig. 1 is a transverse section through a belt showing a preferred form of block and tip unit, parts of the tip unit and blocks being shown in section;

Fig. 2 is a plan of the belt portion illustrated in Fig. 1, a portion of the illustrated structure being shown in section as viewed upon the line 2—2 of Fig. 1;

Fig. 3 is an end elevation of the structure shown in Fig. 1, parts being broken away for clarity of illustration;

Fig. 4 is a view similar to Fig. 1, but showing a modified form of the invention;

Fig. 5 is a plan of the embodiment shown in Fig. 4;

Fig. 6 is an end elevation of the structure illustrated in Fig. 4, parts being broken away;

Fig. 7 is a view similar to Fig. 1, but showing a still further embodiment of the invention;

Fig. 8 is a plan of the structure shown in Fig. 7; and

Fig. 9 is an end elevation of the embodiment illustrated in Fig. 7.

It has been standard practice for many years to use, in transmissions of the "Reeves type" belts generally corresponding to the showing of Fig. 5 of the patent to M. O. Reeves No. 1,446,018. It will be obvious that many problems have been involved in producing such belts.

First, all of the blocks secured to the outer surface of the belt must, on theory, be absolutely identical; and all of the blocks secured to the inner surface of the belt must likewise be theoretically identical in dimensions and proportions and longitudinal contour. Obviously, in working with wood it is impossible to maintain such identity within close tolerances.

Looking at Fig. 2 of the above-identified patent, it will be clear that the outer surfaces of the pads 17 on one side of the belt must lie in an absolutely common plane, while the outer surfaces of the pads 17 at the other side of the belt must likewise lie in an absolutely common plane if the belt is always to have an uniformly satisfactory power-transmitting engagement with the faces of the discs 16. Of course, Fig. 2 of the above-identified patent discloses only one set of blocks. When a belt of the character illustrated in Fig. 5 of that patent is used, the problem of producing satisfactory engagement with the disc faces is multiplied by the requirement that the outer surfaces of the pads associated with the blocks secured to the outer surface of the belt shall lie exactly in the planes of the outer surfaces of the pads secured to the inner surface of the belt.

Because it has been impossible to work, with wood blocks, to sufficiently close tolerances, it has been necessary, in producing belts of the character under consideration, to secure the pads to the blocks, thereafter secure the blocks to the belt body, and thereafter operate upon the belt with a machine similar to a lathe, cutting away the outer surfaces of all of the friction pads which project beyond the optimum plane to bring all of those surfaces into that optimum plane.

It is well known that the best friction surface for use in an organization of the character here under consideration is the hair side of good leather. It has been the practice, therefore, to secure the pads to the blocks with the inner surface of the hide in contact with the block ends, thus leaving the hair side of the leather exposed for engagement with the pulley discs. But because of the necessity for planing down the exposed surfaces of the pads to bring them into a common operative plane, much of this optimum friction surface has, in the past, been cut away and destroyed before the belt has ever gone into use.

One method of attempting to preserve this optimum surface for operative use in the belt is disclosed in the patent to Paul Reeves No. 2,054,339; but this method of producing a belt has been found to be almost prohibitively expensive.

Another objection to belts of the kind illustrated in Patent 1,446,018 arises because of the necessity for using brads or tacks to supplement the glue in securing the leather pads to the block ends. The nail heads must, of course, be countersunk, as suggested in Patent 1,446,018 and specifically illustrated in Patent 2,054,339, because projection of the nail heads into the plane of the friction surface so seriously reduces the coefficient of friction as to make it impossible to use a belt in which the nail heads are exposed. But such countersinking must not be continued much below the median plane of the pad, else the anchorage effect of the nails will be so reduced as to render the belt incapable of continued use.

It has been found that, particularly where it is necessary to cut away a material depth of the hair side of the belt, wear of the leather tips is fairly rapid, and the nail heads become exposed, as a result of that wear, in so short a time as to reduce the life of the belt beyond a reasonable value. Thus, the presence of the nails, necessary in the construction illustrated in Patent 1,446,018, very materially shortens the available life of the belt.

According to the present invention, which, as will appear from the following description, makes it unnecessary to cut away any of the exposed hair side of the belt, the use of nails with their heads set into the leather is unnecessary. The uncut hair side of the leather is so much tougher than the inner portion of the leather that it has been found that the wearability of pads from which no portion of the hair side has been removed is between 400% and 500% better than pads which have been planed away in the manner above described.

Still further, according to the present invention, even when, after long years of service, the pads do become worn, it is possible, by a very simple manipulation, to replace the worn pads with new pads, without the use of special tools or equipment.

It is known that metal can be worked to closer tolerances than can wood; and various efforts have been made, in the past, to use metal in building up a belt for the transmission of power between V-pulleys, various means having been used for providing a satisfactory friction surface on the belt. So far as I am advised, however, no satisfactory structure of this character has heretofore been devised.

According to the present invention, I provide a friction element comprising a pad of suitable friction material supported upon and carried by a carrier which may be readily attached to the stiffener blocks associated with a belt body in an organization of the character here under consideration. In its preferred form, the structure disclosed in the present application solves all of the problems above discussed.

Referring more particularly to Figs. 1 to 3 inclusive it will be seen that I have illustrated a belt body indicated by the reference numeral 10, to the inner surface of which is secured a longitudinally spaced series of transversely arranged metal blocks 11, and to the outer surface of which is secured a corresponding series of metal blocks 12. Each of the blocks 11 is, in the illustrated form of the invention, formed with a pair of threaded perforations 13, 13, and each of the blocks 12 is formed with a corresponding pair of perforations 14, 14 which, when the blocks 11 and 12 are arranged in pairs, register with the perforations 13, 13. Screws 15, 15 pass through the perforations 14, 14 and through aligned perforations in the belt body 10, and threadedly enter the perforations 13, 13 to secure the block pair 11 and 12 to the belt body. Preferably, spring washers 16, 16 underlie the heads of the bolts 15, 15, preferably within recesses formed in the outer surface of each block 12.

One end of the block 11 provides an inclined surface 17 lying exactly in the plane of an inclined surface 18 formed at the corresponding end of the block 12. Similarly, the opposite end of the block 11 forms an inclined surface 19 lying exactly in the plane of a surface 20 formed at the corresponding end of the block 12.

My improved friction unit is indicated generally by the reference numeral 21. Said unit comprises a pad 22 of suitable friction material which will preferably be good leather arranged with its hair side 23 exposed. The carrier for said pad 22 is indicated generally by the reference numeral 24. Said carrier comprises a backing piece 25 which will be sufficiently rigid to support the pad 22 as it bridges the space between the surfaces 17 and 18. As is clearly shown in Figs. 1, 2, and 3, the backing piece 25 is formed with a pair of slots 26, 26 which are elongated in a direction transverse to the line of movement of the belt body 10. The carrier 24, in the illustrated embodiment of the invention is formed of resilient material, and is formed to provide a tongue 27 which is adapted to overlie and engage resiliently a surface of the block 12 angularly related to the surface 18. Said carrier is further formed with a tongue 28 which is adapted to overlie and resiliently engage a surface of the block 11 angularly related to the surface 17. Preferably, the tongue 27 is formed with an opening 29 for a purpose later to be described.

It will be seen that the carrier construction is such as to make it possible to clip the carrier 24 to the corresponding ends of the two blocks 11 and 12 after said blocks have been associated with the belt body 10, the carrier being so constructed that it will be resiliently retained in place upon the said block ends to bridge the space between the blocks and to support the pad 22 resiliently in place relative to said blocks. Because the surfaces 17 and 18 of the blocks 11 and 12 can be preliminarily brought exactly into a common plane at a predetermined angle to the plane of the belt body, the backing piece 25 will, when the carrier 24 is clipped to the block ends, lie exactly in a predetermined position relative to the median plane of the block assembly. Therefore, if the thickness of each pad 22 is preliminarily adjusted to a predetermined value by dressing the inner sides of the pads, the exposed hair side surfaces 23 of all of the pads will lie in a common plane.

The carriers 24 are suitably constructed to support and secure the pads 22 in place thereon. In the illustrated embodiment of the invention, each carrier 24 is formed with a plurality of tongues 30 and a plurality of tongues 31 which may be sharpened and driven into the edges of the pad 22 to secure the same in place.

Preferably, the surface 18 of the block 12 will be formed with one or more lateral projections 32. In the illustrated embodiment of the invention, each of these projections is elongated in a direction transverse to the line of movement of the belt body 10. The surface 17 will be correspondingly formed with similar projections 33. As is clearly illustrated in Figs. 1, 2, and 3, these projections 32 and 33 are so arranged and related as to enter the slots 26 of the backing piece 25 when the carrier 24 is clipped into position; and it will be seen that the projections are snugly engaged by the walls of the slots in the direction of the line of belt body movement. Thus, twisting stresses or stresses tending to move the carriers 24 in a direction in the line of belt movement will be transmitted between the blocks and the carrier through the projections 32 and 33 and the walls of the slots 26, rather than through the resilient fingers 27 and 28. If desired, the block 12 may further be formed with a projection 34 taking into the slot 29 in the finger 27 to aid in the transmission of such stresses.

The carrier will preferably be provided with a finger 35 overlying the upper end of the pad 22.

It will be clear that the construction of the ends of the blocks 11 and 12 upon which are formed the surfaces 19 and 20, and the manner of association therewith of a friction unit 21, will correspond in all respects to the above description of the right-hand end of the assembly, just described.

Some of the advantages of the preferred form of the invention can be attained through the use of friction units similar to the unit 21 in connection with wood blocks. An organization comprising wood blocks and friction units is illustrated in Figs. 4, 5, and 6, in which the reference numeral 40 indicates a belt body with the inner surface of which is associated a series of wood blocks 41, and with the outer surface of which is associated a corresponding series of wood blocks 42. The blocks 41 are formed with perforations 43, 43 aligning with perforations 44, 44 in the blocks 42; and bolts 45, 45 pass through said perforations, and through aligned perforations in the belt body 40, to receive cap nuts 46, 46, whereby each pair of blocks 41, 42 is secured to the belt body. Preferably, the heads 47, 47 of the bolts 45, 45 are received in countersinks 48, 48 in the inner surface of the block 41.

The block 41 is formed at one end with an inclined surface 49 lying as closely as possible in a common plane with a similar surface 50 formed at the corresponding end of the block 42. At its opposite end, the block 41 is formed with an inclined surface 51 lying as closely as possible in a common plane with an inclined surface 52 at the corresponding end of the block 42.

A removable friction unit is indicated generally by the reference numeral 53 and comprises a pad 54 of suitable friction material suitably secured to and carried by a carrier indicated generally by the reference numeral 55. Said carrier comprises a backing piece 56 adapted to engage, and to bridge the space between, the surfaces 49 and 50, said backing piece being of sufficient rigidity suitably to support the pad 54 as it bridges the space between the blocks 41 and 42.

The backing piece 56 is formed with slots 57, 57 and 58, 58, elongated in the direction of a line transverse to the line of movement of the belt body, for a reason later to be explained.

The carrier 55 comprises a tongue 59, angularly related to the backing piece 56, and bifurcated at 60 to straddle the adjacent bolt 45, a spring washer 61 preferably being interposed between the cap nut 46 and the furcations of the tongue 59, whereby the nut 46 and washer 61 will cooperate with said furcations to secure the carrier 55 removably in place relative to the blocks 41 and 42.

The backing piece 56 is provided with a suitable plurality of tongues 62 and 63, engaging the pad 54 to hold the same in place; and some or all of said tongues may be sharpened and driven into the edges of the pad 54.

To perform the function of the projections 32 and 33 of the embodiment of the invention illustrated in Figs. 1 to 3, headed brads 64 and 65 may be preliminarily driven into the ends of the blocks 41 and 42 to be received in the slots 57 and 58 of the backing piece 56.

The methods of assembly and operation of the structure illustrated in Figs. 4 to 6 will be clear from the above description.

A somewhat simplified form of the invention, lacking only the feature of ready removability and replaceability of the friction elements, is illustrated in Figs. 7, 8, and 9. In those figures, the reference numeral 70 indicates a belt body with the inner surface of which is associated a series of stiffener blocks 71, and with the outer surface of which is associated a corresponding series of stiffener blocks 72. The blocks 71 and 72 will preferably be formed of metal, or similar material readily workable to close tolerances. Each block 72 is formed with a pair of threaded perforations 73, 73, and each block 71 is formed with corresponding perforations 74, 74 adapted to align with the perforations 73. Headed screws 75, 75 take through the perforations 74, 74 and into the threaded perforations 73, 73 to clamp the blocks 71 and 72 upon the belt body 70.

One end of the block 71 is recessed to produce an inclined surface 78 lying exactly in the plane of an inclined surface 79 formed at the base of a recess similarly formed in the corresponding end 77 of the block 72. A rigid backing piece 80 is received in the block end recesses to lie against the surfaces 78 and 79. Supported against said backing piece 80 and received within the recesses in the block ends is a pad 81 of suitable friction material, which is secured in place in said recesses by tongues 82 formed upon the recess walls and preferably driven into the edges of said pad.

The opposite ends 83 and 84 of the blocks 71 and 72 are similarly recessed to provide coplanar surfaces 85 and 86 against which lies a corresponding backing piece 87 similarly carrying a pad of friction material 88 similarly secured in place.

I claim as my invention:

1. The combination with a belt band and a plurality of transversely arranged stiffener blocks associated with opposite surfaces of said band in mating pairs, of friction units for the lateral ends of said blocks, each of such units comprising a rigid backing piece directly contacting the corresponding ends of a pair of blocks and bridging the space therebetween, and a pad of friction material engaging said backing piece and secured in place relative to the said ends of said block pair, each of said block ends being provided with a lateral projection, and each of said unit backing pieces being formed with an opening receiving such projection and snugly engaging the same in the direction of belt movement.

2. The combination with a belt band and a plurality of transversely arranged stiffener blocks associated with opposite surfaces of said band in mating pairs, of friction units for the lateral ends of said blocks, each of such units comprising a rigid backing piece directly contacting the corresponding ends of a pair of blocks and bridging the space therebetween, and a pad of friction material engaging said backing piece and secured in place relative to the said ends of said block pair, each of said block ends being provided with a lateral projection, and each of said unit backing pieces being formed with an opening receiving such projection, each opening being elongated materially beyond the corresponding dimension of the received projection in a direction transverse to the line of belt movement but snugly engaging such projection in the direction of such line of movement.

3. The combination with a belt band and a plurality of transversely arranged stiffener blocks associated with said band, of friction units for the lateral ends of said block, each of said units comprising a pad of friction material carried by a resilient clip provided with portions resiliently engageable with a block end to secure said unit removably in place on such block end.

4. The combination with a belt band and a plurality of transversely arranged stiffener blocks associated with opposite surfaces of said band in mating pairs, of friction units for the lateral ends of said blocks, each of such units comprising a pad of friction material carried by a resilient clip formed to provide a rigid backing piece adapted to engage the corresponding ends of a pair of blocks and to bridge the space therebetween, and further formed to provide spring fingers resiliently engageable with said block ends to secure said unit removably in place on said block ends.

5. A belt block friction tip comprising a pad of friction material and an element receiving and carrying said pad, said element being formed to provide a backing piece directly supporting said pad and adapted to overlie the lateral end of a belt block, and with a bifurcated tongue adapted to overlie a surface of such block angularly related to such end, and to straddle a fastening element associated with said block to secure said unit to said block.

6. The combination with a belt band and a plurality of transversely arranged stiffener blocks associated with said band, of friction units secured to the lateral ends of said blocks, each of said units comprising a rigid backing piece directly contacting the associated block end and a pad of friction material engaging said backing piece and secured to said block end, each of said block ends being provided with a lateral projection, and each of said unit backing pieces being formed with an opening receiving such projection and snugly engaging the same in the direction of belt movement.

7. The combination with a belt band and a plurality of transversely arranged stiffener blocks associated with said band, of friction units secured to the lateral ends of said blocks, each of said units comprising a rigid backing piece directly contacting the associated block end and a pad of friction material engaging said backing piece and secured to said block end, each of said block ends being provided with a lateral projection, and each of said unit backing pieces being formed with an opening receiving such projection, each opening being elongated materially beyond the corresponding dimension of the received projection in a direction transverse to the line of belt movement but snugly engaging such projection in the direction of such line of movement.

8. The combination with a belt band and a plurality of transversely arranged stiffener blocks associated with said band, of friction units for the lateral ends of said block, each of said units comprising a pad of friction material carried by a resilient clip provided with portions resiliently engageable with a block end to secure said unit removably in place on such block end, each of said block ends being provided with a lateral projection, and each of said unit backing pieces being formed with an opening receiving such projection and snugly engaging the same in the direction of belt movement.

9. The combination with a belt band and a plurality of transversely arranged stiffener blocks associated with said band, of friction units for the lateral ends of said block, each of said units comprising a pad of friction material carried by a resilient clip provided with portions resiliently engageable with a block end to secure said unit removably in place on such block end, each of said block ends being provided with a lateral projection, and each of said unit backing pieces being formed with an opening receiving such projection, each opening being elongated materially beyond the corresponding dimension of the received projection in a direction transverse to the line of belt movement but snugly engaging such projection in the direction of such line of movement.

PAUL B. REEVES.